(12) United States Patent
Thirion

(10) Patent No.: US 9,791,763 B2
(45) Date of Patent: Oct. 17, 2017

(54) DEVICE AND METHOD TO STANDARDIZE PHOTOGRAPHY ACQUISITION

(71) Applicant: QUANTIFICARE S.A., Valbonne (FR)

(72) Inventor: Jean-Philippe Thirion, Valbonne (FR)

( * ) Notice: Subject to any disclaimer, the term of this patent is extended or adjusted under 35 U.S.C. 154(b) by 0 days.

(21) Appl. No.: 14/727,883

(22) Filed: Jun. 2, 2015

(65) Prior Publication Data

US 2016/0018719 A1  Jan. 21, 2016

(30) Foreign Application Priority Data

Jun. 17, 2014  (FR) ...................... 14 01365

(51) Int. Cl.
*G03B 13/20* (2006.01)
*G03B 13/16* (2006.01)
*G03B 15/14* (2006.01)

(52) U.S. Cl.
CPC ............. *G03B 13/20* (2013.01); *G03B 13/16* (2013.01); *G03B 15/14* (2013.01)

(58) Field of Classification Search
CPC .......... G02B 7/32; G03B 15/035; G03B 3/00
USPC ......... 396/109, 107, 233, 431, 544; 348/375
See application file for complete search history.

(56) References Cited

U.S. PATENT DOCUMENTS

| | | | | | |
|---|---|---|---|---|---|
| 4,298,262 A | * | 11/1981 | Nozawa | ................. | G03B 15/03 359/825 |
| 4,423,470 A | * | 12/1983 | Naito | ..................... | G03B 15/05 362/11 |
| 4,777,501 A | * | 10/1988 | Caimi | .................... | G03B 17/08 396/107 |
| 5,142,299 A | * | 8/1992 | Braun | ..................... | G02B 7/32 396/107 |
| 5,289,220 A | * | 2/1994 | Fidler | ..................... | G02B 7/32 396/107 |
| 6,320,641 B1 | * | 11/2001 | Bauer | ............... | G01N 21/8806 348/E5.029 |
| 6,774,945 B1 | * | 8/2004 | Bohn | ..................... | G02B 7/28 348/345 |
| 6,954,313 B2 | * | 10/2005 | Kaneda | ................ | G02B 7/102 359/694 |
| 2007/0122138 A1 | * | 5/2007 | Sugiyama | ............. | G03B 15/03 396/182 |
| 2010/0021151 A1 | * | 1/2010 | Nubling | ................ | G03B 15/03 396/61 |

\* cited by examiner

*Primary Examiner* — Rochelle-Ann J Blackman

(57) ABSTRACT

The device and method are intended for the standardization of picture taking without contact with the subject. Two light beamers converging at a distance within the range of camera focus are enabling reproducible viewing conditions via superimposition of the spots of the beamers on the subject and the light of the beamers are extinguished during picture taking in order not to bias the image. The device is constituted of a body (1) adaptable to a camera (1) with objective (2) and is including two light beamers (4A) and (4B) whose beams (5A) and (5B) are converging at a distance (D) within the focus range of the camera as well as a mechanism to extinguish the light beamers during picture taking. It can be improved by enabling the covering of the focus ring (2) and zoom ring (8) of camera (1).

9 Claims, 3 Drawing Sheets

DEVICE AND METHOD TO STANDARDIZE PHOTOGRAPHY ACQUISITION

BACKGROUND INFORMATION

The present invention relates to the field of making photography acquisitions more standard. Very often, a user has difficulties in taking high quality photography pictures of a subject which are at the same time centered, framed and perfectly focused. In addition, the greater the sophistication of the camera, the more difficult is the standardization due to the multiple options in camera settings.

Devices have been designed in order to constrain the photo acquisition for specific applications as in the case of medical photography. It has been proposed to use a rigid frame onto or within which the subject is placing a part of their anatomy such as the face. The camera is fixed on a rigid frame and tuned so that the focusing distance is corresponding to the expected position of the subject. Specifically, this approach has been used in the case of image boxes—a kind of half-spheres comprised of a fixed camera device where the subject places their head. A major drawback of such system is that it needs a physical contact between the rigid repositioning frame and the subject, which may be an issue in the case of a medical application when the subject of the photography is presenting opened wounds or burns and when there is a risk of infection. Another drawback of rigid frames is the visibility in the image which may hide some parts of the subject. Finally, such a frame can be cumbersome and quite difficult to transport.

Another way to ensure reproducibility relative to aiming distance consists in fixing a rigid spindle to the camera and to setup the focus distance so that it corresponds to the length of the spindle. Hence, by putting the tip of the spindle into contact with the subject, one can ensure a reproducible distance for picture taking. Although a spindle can be transported more easily than a rigid repositioning frame, there remains issues relative to contact with the subject and visibility of the spindle in the image, which can obstruct parts of the body.

Another way to measure the distance between a camera and a subject consists in using light beamers which are converging at the focusing distance of the camera, which can be used either to measure a distance or to automatically pilot an adaptive optics.

One example of adaptive optics making use of light beamers is presented in the German Patent EP 2 136 248 A1, SICK AG [DE], Dec. 23, 2009 (2009-12-23), in particular paragraphs [0038]-[0053] and FIGS. 1 to 3. The aim of this device is to pilot the focus of a dedicated camera in order to focus the camera at a given distance. It is not an autonomous photography accessory adapting to a standard photography camera device, and it doesn't aim at blocking the focus of its optics at a given distance but on the contrary a way to pilot the optics so that its focus distance is adapting in real time.

The international patent PCT WO 90/09560 A1, John Lysaght Limited [AU], Aug. 23, 1990 (1990-08-23), in particular page 2, line 26 and page 3, line 2, and FIG. 2 are presenting a device that aims at measuring the distances between objects by using light beamers, and more specifically to measure the relative distances between objects or parts of the same object by analyzing the relative position of light beamers on the subject. It is not a device intended to pilot focusing or to block the focus at a given distance.

The U.S. Pat. No. 6,340,114 B1, Correa Mark [US] et al, of Jan. 22, 2002 (2002-01-22) is describing a device for optical codes reading, constituted of a system to project a light pattern made of two concentric rectangles in order to make sure that the optical code to read is comprised between a minimal and a maximal distance from the reading device by making sure that the optical code is encompassed between the two projected rectangles. Notably in such as case, the device is a video camera and not a photographic camera and also the overlapping of beams is not used given that the light projector is unique. This device is one amongst many dedicated devices incorporating a light pattern projector enabling aiming at or encompassing a targeted subject. Such a device is not an autonomous photographic accessory which can adapt to a standard photographic camera, and it is also not aiming at blocking the focus distance of the optics of the camera to a given distance.

For this set of devices including light pattern projection which we just described, none is detailing any mechanism to de-activate the light beamers during picture taking. Indeed, in most of the cases, the flash light is powerful enough so that beam lights cannot be visually detected in the image. Practically speaking, it is mostly in the field of medical image analysis which is the main purpose of the present invention that it is interesting to make sure not to bias the image by stray light such as those created by the light beamers. Indeed, medical image processing algorithms are generally sensitive enough to perceive relatively reduced stray light and in this field of application, any source of bias in measurement must be avoided.

The devices using light pattern projection as just described are concerning video cameras or photographic cameras dedicated to industrial measurements for which extinguishing light beamers during the image acquisition is not important enough to justify the design of a specific extinguishing mechanism.

These devices are not adaptable to existing standard photographic cameras but are integrated systems specifically designed for their industrial application objectives. These integrated devices are therefore not a photographic equipment accessory. Their function is not to block the focus distance of a standard photographic camera in combination with light pointers in order to make is useful for standardized photography taking.

BRIEF SUMMARY OF THE INVENTION

The device is disclosed being independent from but adaptable to a standard photographic camera and its aim is to increase the standardization of the photography. The device is equipped with two light beamers whose beams are converging at a fix distance. By making sure that the two light beam spots are overlapping over the subject, one is ensuring that the picture is well focused and by placing the spot at the center of the subject one is ensuring that the picture is well framed. The device is enabling to extinguish the light beamers during picture taking so that the image is not biased by the light of the beamers.

In a specific implementation, the device body is covering the focus ring of the photography camera and the camera focus is set at the same distance D so that when the user is superimposing the beams plots at the center of the subject, the picture taken is sharp and well centered. The device body can be improved by enabling covering also the zoom ring of the optics to ensure reproducible framing. In another implementation, the device is equipped with particularly clever two-stage push button system which is automatically extinguishing the light of the beamers when the picture is taken. In yet other implementations, the device is including different combinations of mechanisms to block the focus, to block the zoom and to automatically shut down the beamers.

One important advantage of the device is that it does not require any physical contact with the subject. Thus, one is preventing contamination with the subject in case of medical application and no part of the device is visible in the field of view of the camera. Hence, there are no hidden parts of the subject as opposed the case of a repositioning frame or a rigid spindle usage.

Another important advantage of the device is that it is easily adaptable to an existing photographic camera and is not a built-in photographic system as in the case of dedicated cameras: it is an accessory to an existing camera and not an inherent part of the camera itself.

Yet another advantage, when equipped with the mechanism which automatically shuts down the beamer lights during picture taking, is that the image is not biased by the beamers lights as in case the case of a processed image by medical image processing algorithms which could be sensitive to very subtle stray light.

DETAILED DESCRIPTION OF THE INVENTION

Figure 1:
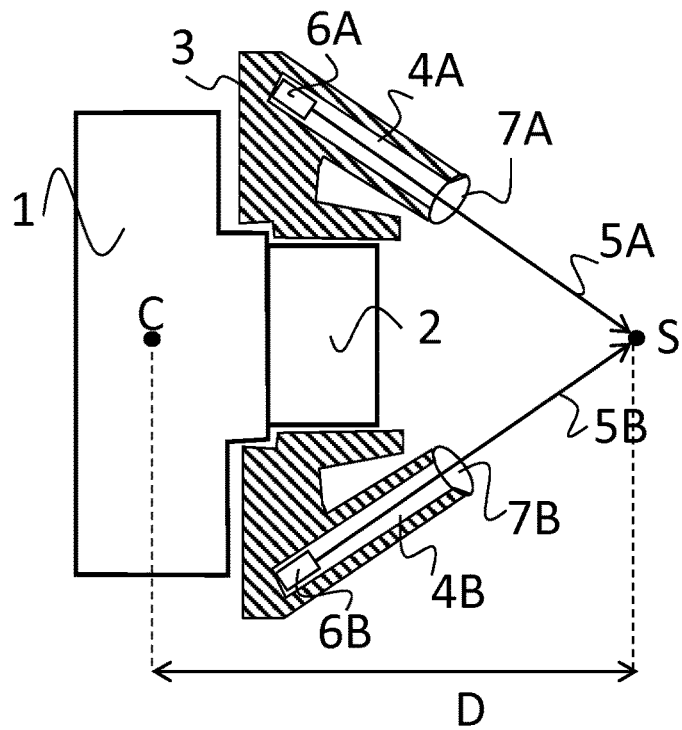
FIG. 1 is representing a cross-section of the device 3 placed on a standard camera 1 and its optics 2.

The invention is a device which is adapting to a standard photography camera and is equipped with two light beamers converging at a fixed distance corresponding to the focus range of the camera. By positioning the device at a distance to the subject where the two spots are overlapping, one is ensuring that the picture taken can be well focused and by centering the spot at the center of the subject under examination, one is ensuring the framing of the view. The device is enabling the extinguishing of the beamers during picture taking so that the image is not biased by beamers light.

In a specific implementation of the device, the device body is covering the focus ring of the camera and the focus is preset to the distance of convergence of the light beamers so that the user cannot accidentally change focus settings.

Light beamers must be considered in its broadest meaning as it can be light sources focused by lenses, LEDs, lasers or other types of light systems. The light spot produced by each of the light beamer can have different shapes such as a circle, a disk, a cross or other shapes without impacting the nature of the invention.

According to different implementations of the device:

The focus ring of the optics, once set at the distance of convergence of the light beamers can be blocked in a temporary or a definitive position, for example by the use of glue, screw or tape.

The body of the device is covering the zoom function of the optics of the camera. As for the focus ring of the optics, the zoom ring can be blocked in a temporary or a definitive position in order to ensure a fix width for the field of view.

The light beamers are powered thanks to the ring fixating the optics to the camera.

The device is equipped with a light detector triggered by the flash to shut down the light of the beamers when the flash is activated.

A signal is acquired via the ring fixating the optics to the camera or via the flash shoe to detect picture taking and extinguish the beamers during picture taking.

A trigger button is used to switch on the light beams.

A two-stage trigger button is used so that a tap on the trigger button is switching on the light of the beamers and when fully depressed, the light of the beamers is extinguished.

The two-stage trigger button of the camera itself which is designed to activate the focus and to trigger the image acquisition is used also to switch on the beamers light and extinguish it during picture taking.

One important advantage of the invention when used in combination with a temporary fixation of the focus ring and/or the zoom ring is to enable easy dismantle of the device body, reset of the focus and zoom and remounting of the device body to the camera to adapt the system to a field of view suitable to a new application.

By reference to drawings, the device is adaptable to a standard camera 1 and optics 2 with optical center placed is C and is comprising a body 3 and at least two light beamers 4A and 4B whose beams are converging to a point S. The focus distance of the optics 2 is set, with autofocus or preset, such that it is equal to the distance D separating the optical center C and the convergence point S of beamers light 5A and 5B.

According to the exemplary device shown in FIG. 1, the light pointer 4A is made of a tube imbedded in the device body 3, a lens 7A and a light source 6A and the light pointer 4B is made of a tube imbedded in the device body 3, a lens 7B and a light source 6B.

In other implementation variations not represented in the drawings the light pointers are constituted of a set of several lenses, LEDs or of lasers in order to ensure a higher coherency of the light beams. The beam spots created by each light pointer can have different shapes such as a circle, a disk, a cross or even different shapes without changing the functioning of the invention.

According to other implementations not represented in the drawings, the optics is set to manual focus and once the focus is set, the focus ring of the optics is blocked to avoid any maladjustment. Different means to block the optics are possible before covering the optics 2 with the device body 3 such as using glue, a screw or adhesive tapes.

Figure 2:
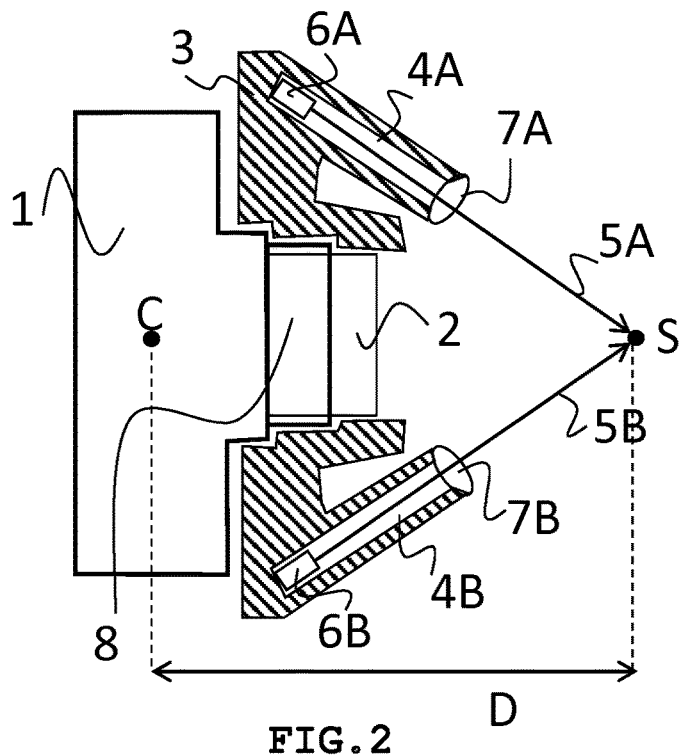
FIG. 2 is representing a cross-section of the device 3 placed on a standard camera 1 with an optics 2 and a zoom 8 and covering both the focus function of optics 2 and the zoom ring of zoom 8.

According to the exemplary device shown in FIG. 2, the optics 2 is equipped with a zoom 8 and the device body 3 is adapted such that it is blocking at the same time the ring of zoom 8 and the focus ring of optics 2.

Figure 3:
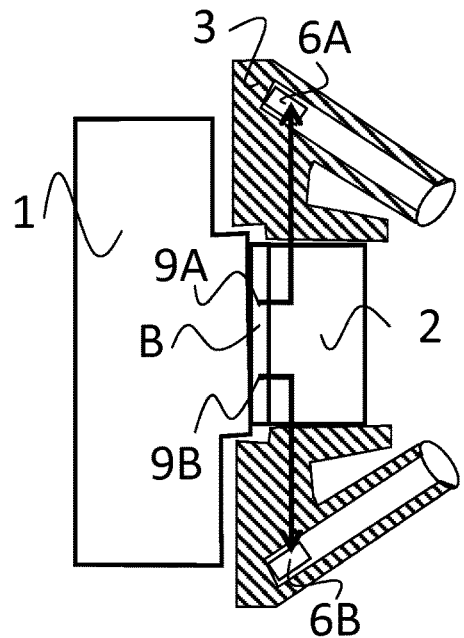
FIG. 3 is representing a cross-section of the device 3 placed on a standard camera 1 with an optics 2 and with the implementation where the beamers are powered via the optics fixation ring.

According to the exemplary device shown in FIG. 3, the powering of the light beamers is made via sets of cables 9A and 9B powered directly by the camera. One way to perform such powering consists in using the electrical outlet that numerous types of camera are equipped with, in particular SLR cameras, at the level of the ring that fixes the optics to the camera or the shoe where external flashes are plugged.

One way to make use of these electrical outlets is to add an intermediate ring B between the camera and the optics to transmit this source of power to the light pointers via sets of electrical cables 9A and 9B. The intermediate ring B can be used not only to feed power but also to capture the different signals emitted by the camera, such as the focusing signal when the user is performing a tap or is half pressing the camera shutter release, or such as the triggering signal when the user is fully depressing the camera shutter release. Similar signals can be obtained from the flash shoe of the camera or from other means depending upon camera models. The interpretation of these signals can be performed via a microchip placed in the device body 3 or in the intermediate ring B itself and can switch on and of the light of the beamers thanks to signals transmitted to light sources 6A and 6B. It is understood that signal has a broad meaning and can be wireless electromagnetic waves or electric signals conducted by the sets of cables 9A and 9B. Hence, according to this implementation, switching on the camera or activating focusing by a tap on the shutter release is switching on the light beamers and fully depressing the camera shutter release is extinguishing simultaneously the beamers light and taking the picture, which is preventing from detecting the spot lights due to the beamers in the image.

Figure 4:
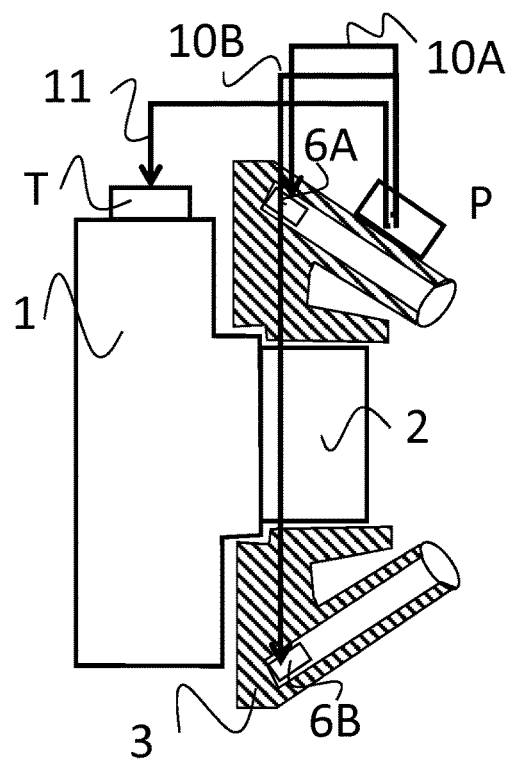
FIG. 4 is representing a cross-section of the device 3 placed on a standard camera 1 with an optics 2 and where the device is equipped with a two-stage trigger button which, when half-pressed, is switching on the beamers and when fully depressed, is taking the picture and extinguishing the beamers simultaneously.

According to the exemplary shown in FIG. 4, the body of the device 3 is equipped with a push button P which enables to switch on the light beamers via two signals 10A and 10B. These signals 10A and 10B shall be understood in a broad meaning and can be wireless electromagnetic signals, electrical signals carried by metallic cables or any other signal enabling to switch the light beamers on. Hence, with a tap of the finger, the user can start or stop the light beamers. According to this implementation, light beamers can be fed by a battery placed in the device body 3 or via electrical wires not represented in the figure and coming from the camera 1 directly or via an intermediate ring B.

Still according to the exemplary shown in FIG. 4, when the camera 1 is equipped with a function for external triggering T, a variation of implementation consists in using a two stage push button P, where a first stage is switching on the light of the beamers via signals 10A and 10B, and where as a second stage the light of the beamers are extinguished and the shutter is released simultaneously to picture taking, thanks to a signal 11 linked to the shutter release system T of the camera.

Evidently, other combinations of light beamers switching on and off mechanisms as well as power feeding are possible in association to FIGS. 3 and 4. As an example, extinguishing the light beamers could be performed via a signal coming from the flash shoe of the camera or via a photosensitive detector that would detect the flash of the camera when such a flash is used.

According to an exemplary not illustrated in a figure, the device is equipped with more than two beamers in order to define different distances within the range of focusing of the camera and the autofocus of the camera is used so that multiple standardized distances can be achieved. As an example, a way to implement this in the case of two pre-defined distances is to use two sets of two beamers crossing at two different distances in order to capture short distance pictures and long distance pictures in a standardized way.

Figure 5:
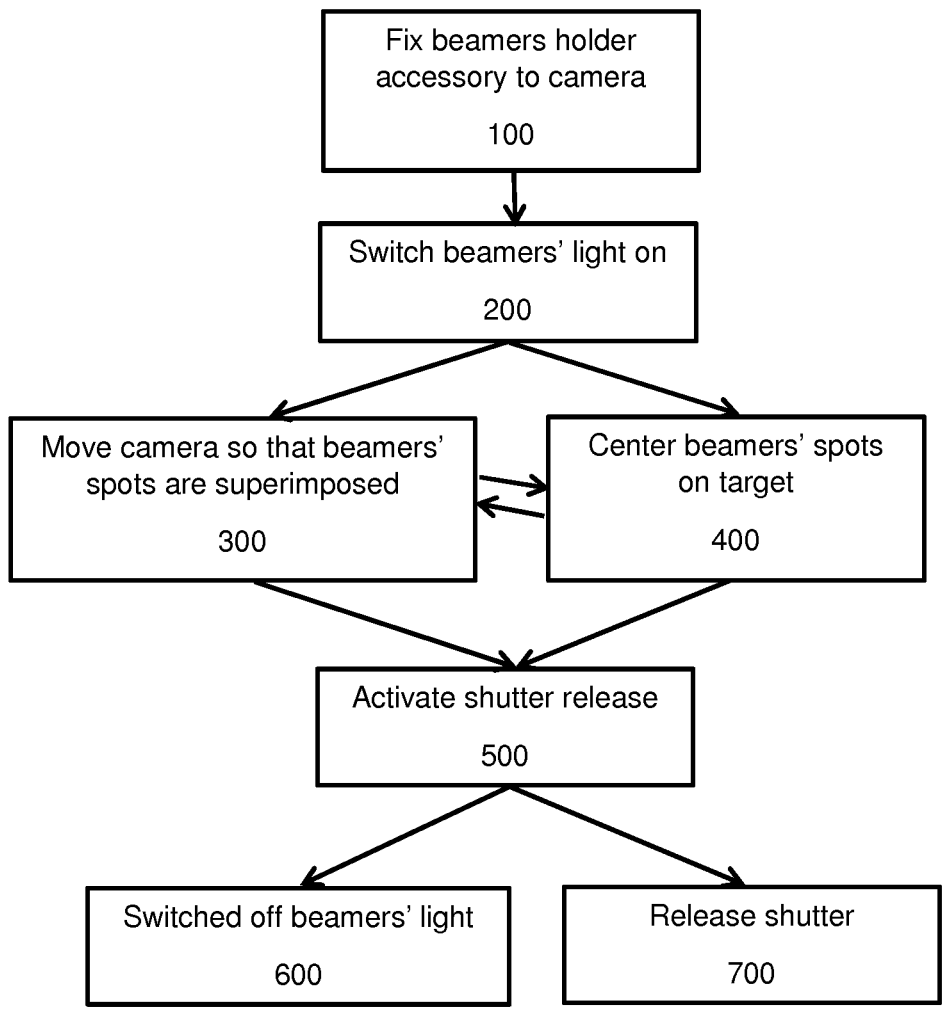
FIG. 5 is presenting a method to take reproducible pictures by which an accessory with light beamers is fixed to the camera and used to define distance and centering of the camera's field of view and where the beamers' light are switched off when the picture is taken.

The invention also relates to a method to take reproducible pictures as shown in FIG. 5 and by which, as a first step, an accessory supporting at least two light beamers is fixed to a camera 100, the light of the beamers are then switched on 200, the user is then alternatively setting the distance to the subject by superposing the beamers' spots on the subject 300 and centering the beamers' spots on the subject 400, the user is then initiating picture taking 500 and finally and simultaneously, the light of the beamers is switched off 600 and the shutter of the camera is released 700.

The device and method according to the current invention are intended for standardizing photography snapshots.

What is claimed is:

1. A device to standardize photography picture taking adapting as an accessory to a regular photographic camera, this regular photographic camera being composed of a camera body (1), an optic (2) with at least a focus ring wherein the device is comprising:
    a device body (3) supporting at least two light beamers (4A) and (4B) with respective light sources (6A) and (6B) whose respective focused or coherent light beams (5A) and (5B) are converging to a point (S) such that the distance (D) between the optical center (C) of the camera (1) and the point of convergence (S) of the light beams (5A) and (5B) is included into the focus range of the camera (1),
    a two-stage push button (P) such that a tap on the button is turning the light beamers (4A) and (4B) on and such that additional pressure on the button is simultaneously extinguishing the light beamers (4A) and (4B) and releasing the shutter of the camera (1).

2. The device according to claim 1 wherein the device body (3) is able to restrict the user access to the focus ring of the optics (2).

3. The device according to claim 1 wherein the camera (1) is equipped with a zoom ring (8) and the device body (3) is able to restrict the user access to the zoom (8) of the optics (2) of camera (1).

4. The device according to claim 1 wherein the light beamers (4A) and (4B) are powered via an intermediate ring (B) placed between the camera (1) and the optics (2) and linked via electrical wires (9A) and (9B) to the light sources (6A) and (6B) of the light beamers (4A) and (4B).

5. The device according to claim 1 wherein the extinguishing of light beamers (4A) and (4B) during picture taking is performed in response to a signal received via an intermediate ring (B) placed between the camera (1) and the optics (2) and transmitted to the light sources (6A) and (6B) of the light beamers (4A) and (4B).

6. The device according to claim 1 wherein the two-stage push button (P) is the shutter release button of the camera (1) itself.

7. The device according to claim 1 wherein the camera (1) is equipped with a flash and a photosensitive detector activated by the camera flash is used to extinguishing the light beamers (4A) and (4B) during picture taking.

8. The device according to claim 1 wherein the device body is equipped with more than two light beamers in order to capture standardized pictures at multiple fixed distances.

9. The device according to claim 1 wherein the camera (1) is equipped with a flash shoe and the extinguishing of light beamers (4A) and (4B) during picture taking is performed in response to a signal received via the flash shoe of the camera (1) and transmitted to the light sources (6A) and (6B) of the light beamers (4A) and (4B).

\* \* \* \* \*